(12) United States Patent
Takahashi

(10) Patent No.: US 6,228,147 B1
(45) Date of Patent: May 8, 2001

(54) METHOD FOR OPERATION OF MEMBRANE REACTOR, AND MEMBRANE REACTOR USED THEREIN

(75) Inventor: Tomonori Takahashi, Chita (JP)

(73) Assignee: NGK Insulators, Ltd. (JP)

( * ) Notice: Subject to any disclaimer, the term of this patent is extended or adjusted under 35 U.S.C. 154(b) by 0 days.

(21) Appl. No.: 09/041,641

(22) Filed: Mar. 13, 1998

(30) Foreign Application Priority Data

Mar. 18, 1997 (JP) .................................... 9-064725

(51) Int. Cl.⁷ .................................... B01D 53/22
(52) U.S. Cl. .................................... 95/55; 95/56
(58) Field of Search ................ 205/637; 48/61, 48/127.5, 127.9, 207, 198.7; 585/257, 524; 95/55, 56

(56) References Cited

U.S. PATENT DOCUMENTS

| 4,048,029 | * | 9/1977 | Seitzer | 404/129 |
| 4,981,676 | | 1/1991 | Minet et al. | 423/652 |

FOREIGN PATENT DOCUMENTS

| 0 615 949 A2 | 9/1994 | (EP) . |
| 0 615 949 A3 | 9/1994 | (EP) . |
| 5-194281 | * 8/1993 | (JP) . |
| 5-317708 | * 12/1993 | (JP) . |
| 9-2802 | * 1/1997 | (JP) . |

OTHER PUBLICATIONS

Patent Abstracts of Japan, vol. 018, No. 134 (C–1176), Mar. 4, 1994 & JP 05 317708 A (Mitsubishi Heavy Ind Ltd), Dec. 3, 1993 *abstract*.

Patent Abstracts of Japan, vol. 097, No. 005, May 30, 1997 * JP 09 002802 A (Tokyo Gas Co Ltd; Mitsubishi Heavy Ind Ltd), Jan. 7, 1997 *abstract*.

Patent Abstracts of Japan, vol. 017, No. 627 (C–1131), Nov. 19, 1993 & JP 05 194281 A (Nippon Oil Co Ltd; Others: 01), Aug. 3, 1993 *abstract*.

"Steam Reforming of Methane in a Hydrogen–Permeable Membrane Reactor," Applied Catalysis, 67 (1991) pp. 223–230 by S. Uemiya et al. Month of Publication Not Available.

* cited by examiner

*Primary Examiner*—Kathryn Gorgos
*Assistant Examiner*—J. Maisano
(74) *Attorney, Agent, or Firm*—Parkhurst & Wendel, LLP

(57) ABSTRACT

A method for operation of membrane reactor is provided. In a membrane reactor, the hydrogen formed in the hydrogen formation portion of the reaction chamber is transmitted to the hydrogen separation portion of the reaction chamber via a hydrogen-selectively permeable membrane and thereby the conversion of raw material gas into hydrogen is improved. Steam and/or carbon dioxide into the hydrogen separation portion are added. In the above method for operation of membrane reactor, the surface area of the hydrogen-selectively permeable membrane of membrane reactor can be made smaller while the advantage of membrane reactor of giving a higher conversion of reaction at low temperatures is being maintained.

5 Claims, 4 Drawing Sheets

METHOD FOR OPERATION OF MEMBRANE REACTOR, AND MEMBRANE REACTOR USED THEREIN

BACKGROUND OF THE INVENTION

1. Field of the Invention

The present invention relates to a method for operating a membrane reactor which conducts a hydrogen formation reaction (e.g. a steam reforming reaction or a dehydrogenation reaction) using a hydrogen-selectively permeable membrane, and to a membrane reactor used in the method.

2. Related Art

In a membrane reactor wherein a hydrogen formation reaction (e.g. a steam reforming reaction or a dehydrogenation reaction) is conducted using a hydrogen-selectively permeable membrane (e.g. a Pd membrane or a Pd alloy membrane), the hydrogen formed at the hydrogen formation portion is separated and removed, whereby the conversion of the hydrogen formation reaction is made higher than the equilibrium conversion.

Use of such a membrane reactor can give a high conversion at low temperatures even for a reaction which has heretofore given a high conversion only at high temperatures; consequently, it can give a high yield at low reaction temperatures and is advantageous from the standpoints of the heat energy and reactor material required.

The reactions using a membrane reactor include the following, for example.

(a) In the dehydrogenation reaction of cyclohexane represented by the following formula:

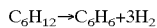

the equilibrium conversion is higher than 90% at 600° C. but is about 50% at 450° C. In this case, when a membrane reactor is used, the $H_2$ of the right side of the above formula is removed, the reaction proceeds further, and a conversion of 90% or higher can be achieved.

(b) In the steam reforming reaction of methane represented by the following formula:

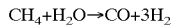

the equilibrium conversion is higher than 90% at 800° C. but is about 50% at 500° C. In this case, when a membrane reactor is used, the $H_2$ of the right side of the above formula is removed, the reaction proceeds further, and a conversion of 90% or higher can be achieved.

There are known membrane reactors having the structures shown in FIGS. 6 to 8.

FIG. 6 shows the structure of a membrane reactor using no sweep gas. In a reaction chamber 1 is filled a catalyst 2 for hydrogen formation reaction. In the reaction chamber 1, a hydrogen-selectively permeable membrane 3 is provided in the vicinity of the catalyst 2. A raw material gas A is fed from an inlet 5 and contacts with the catalyst to form hydrogen; the formed hydrogen is transmitted from a hydrogen reaction portion X to a hydrogen separation portion Y via the hydrogen-selectively permeable membrane 3 and separated; then, the hydrogen is discharged out of the reaction chamber 1 through a hydrogen-discharging pipe 4. Meanwhile, the unreacted gas-containing waste gas from the hydrogen formation portion is discharged outside from an outlet 6. Incidentally, 7 is a sealing plate so that the raw material gas A does not enter the hydrogen separation portion Y.

In a membrane reactor having such a structure, since the hydrogen formed is separated via the hydrogen-selectively permeable membrane 3, the conversion of hydrogen formation reaction can be made higher than the equilibrium conversion.

FIG. 7 shows the structure of a membrane reactor using Ar gas as a sweep gas. In this structure, a hydrogen formation portion X and a hydrogen separation portion Y are completely separated. That is, in FIG. 7, a sweep gas inlet 8 is connected directly with the hydrogen separation portion Y; feeding of a sweep gas B into the hydrogen separation portion Y reduces the hydrogen partial pressure in the hydrogen separation portion Y and thereby a higher conversion is achieved.

FIG. 8 shows the structure of a membrane reactor which uses no sweep gas and whose hydrogen formation portion X and hydrogen separation Y are not separated at any of the raw material gas-introducing section and the formed gas-discharging section. In this structure, the amount of the raw material gas fed into the hydrogen separation portion Y and the additional proceeding of hydrogen formation reaction caused by the hydrogen transmitted through the hydrogen-selectively permeable membrane 3 are appropriately balanced, whereby the proceeding of hydrogen formation reaction can be controlled. The structure of FIG. 8 is advantageous because it has no necessity of sealing.

As stated above, membrane reactors, as compared with ordinary reactors, have advantages but need improvements as follows.

(1) The hydrogen formation reaction such as steam reforming reaction, dehydrogenation reaction or the like takes place in a catalyst. Since there is a space limitation with respect to the geometrical arrangement of the catalyst and the hydrogen-selectively permeable membrane, it is impossible to provide a hydrogen-selectively permeable membrane having an area necessary for removal of formed hydrogen, in the vicinity of the catalyst.

(2) The hydrogen-transmitting amount of the hydrogen-selectively permeable membrane needs be increased.

(3) The hydrogen-transmitting amount of the hydrogen-selectively permeable membrane is determined by the difference in hydrogen partial pressure between the hydrogen formation portion X and the hydrogen separation portion Y. With a high hydrogen partial pressure at the hydrogen formation portion X, however, there are the following problems:

(a) the high hydrogen partial pressure at the portion X is disadvantageous for conversion because the dehydrogenation reaction or steam reforming reaction is a volume-expansion reaction, and (b) the high hydrogen partial pressure at the portion X applies a high mechanical stress to the hydrogen-selectively permeable membrane.

(4) In the membrane reactors of FIG. 6 and FIG. 8, the hydrogen partial pressure at the hydrogen separation portion Y is not sufficiently low.

(5) In the membrane reactor shown in FIG. 7, the Ar gas used as a sweep gas is expensive and moreover, when hydrogen formation is an intended objective, the separation of Ar from hydrogen in the post-operation is difficult.

SUMMARY OF THE INVENTION

The present invention has been completed to alleviate the above-mentioned problems of the prior art and provide (1) a method for operation of membrane reactor, wherein the surface area of the hydrogen-selectively permeable membrane of the membrane reactor can be made smaller while the advantage of a membrane reactor of giving a higher conversion of reaction at low temperatures is being maintained and (2) a membrane reactor used in the method.

According to the present invention, there is provided a method for operation of a membrane reactor, which comprises, providing a membrane reactor wherein the hydrogen formed in a hydrogen formation portion of a reaction chamber is transmitted to the hydrogen separation portion of a reaction chamber via a hydrogen-selectively permeable membrane and thereby the conversion of raw material gas into hydrogen is improved, adding steam and/or carbon dioxide into the hydrogen separation portion.

In the present invention, the preferred structures of the membrane reactor include, for example, a structure wherein the hydrogen formation portion and the hydrogen separation portion are completely separated from each other; a structure wherein the hydrogen formation portion and the hydrogen separation portion are separated from each other at the raw material gas-introducing section and at the reaction section but the gas from the hydrogen formation portion and the gas from the hydrogen separation portion are allowed to merge with each other at the formed gas-discharging section; and a structure wherein the hydrogen formation portion and the hydrogen separation portion are not separated from each other at the raw material gas-introducing section and the gas from the hydrogen formation portion and the gas from the hydrogen separation portion are allowed to merge with each other at the formed gas-discharging section.

In the present invention, a structure is also possible wherein water is fed into the hydrogen separation portion of the reaction chamber and vaporized as steam in the hydrogen separation portion.

According to the present invention, there is also provided a membrane reactor comprising: a reaction chamber comprising a catalyst-filled hydrogen formation portion, a hydrogen separation portion and a hydrogen-selectively permeable membrane dividing the two portions, wherein the hydrogen formed in the hydrogen formation portion by the reaction of a raw material gas is transmitted to the hydrogen separation portion via the hydrogen-selectively permeable membrane and separated, in which membrane reactor
the raw material gas-introducing section is connected with the hydrogen formation portion and the steam and/or carbon dioxide-introducing section is directly connected with the hydrogen separation portion, the two introducing sections being insulated from each other by sealing, and
the hydrogen formation portion and the hydrogen separation portion are not separated at the formed gas-discharging section, and the gas from the hydrogen formation portion and the gas from the hydrogen separation portion are allowed to merge with each other at the discharging section.

In this membrane reactor, the raw material gas-introducing section and the steam and/or carbon dioxide-introducing section may not be insulated from each other by sealing. This structure has an advantage because no complicated structure is required for tight sealing.

According to the present invention, there is also provided a membrane reactor comprising: a reaction chamber comprising a catalyst-filled hydrogen formation portion, a hydrogen separation portion and a hydrogen-selectively permeable membrane dividing the two portions, wherein the hydrogen formed in the hydrogen formation portion by the reaction of a raw material gas is transmitted to the hydrogen separation portion via the hydrogen-selectively permeable membrane and separated, in which membrane reactor the hydrogen formation portion and the hydrogen separation portion are separated from each other and a water-feeding means for feeding water to the hydrogen separation portion is provided.

According to the present invention, there is also provided a membrane reactor comprising: a reaction chamber comprising a catalyst-filled hydrogen formation portion, a hydrogen separation portion and a hydrogen-selectively permeable membrane dividing the two portions, wherein the hydrogen formed in the hydrogen formation portion by the reaction of a raw material gas is transmitted to the hydrogen separation portion via the hydrogen-selectively permeable membrane and separated, in which membrane reactor the hydrogen formation portion and the hydrogen separation portion are separated from each other at the raw material gas-introducing section and at the reaction section, the gas from the hydrogen formation portion and the gas from the hydrogen separation portion are allowed to merge with each other at the formed gas-discharging section, and a water-feeding means for feeding water to the hydrogen separation portion is provided.

According to the present invention, there is also provided a membrane reactor comprising a reaction chamber comprising a catalyst-filled hydrogen formation portion, a hydrogen separation portion and a hydrogen-selectively permeable membrane dividing the two portions, wherein the hydrogen formed in the hydrogen formation portion by the reaction of a raw material gas is transmitted to the hydrogen separation portion via the hydrogen-selectively permeable membrane and separated, in which membrane reactor the hydrogen formation portion and the hydrogen separation portion are not separated from each other at the raw material gas-introducing section, the gas from the hydrogen formation portion and the gas from the hydrogen separation portion are allowed to merge with each other at the formed gas-discharging section, and a water-feeding means for feeding water to the hydrogen separation portion is provided.

DETAILED DESCRIPTION OF THE INVENTION

In the membrane reactor of the present invention, steam and/or carbon dioxide is fed into the hydrogen separation portion, whereby hydrogen is discharged outside as in the case of feeding a conventional sweep gas and the hydrogen partial pressure in the hydrogen separation portion is reduced. Consequently, the separation and removal of hydrogen from the hydrogen formation portion becomes quick and the surface area of the hydrogen-selectively permeable membrane can be made smaller. Further, the geometrical arrangement of the catalyst and the hydrogen-selectively permeable membrane in the reaction chamber becomes easy.

The present invention is described in detail below with reference to the accompanying drawings.

Figure 7:
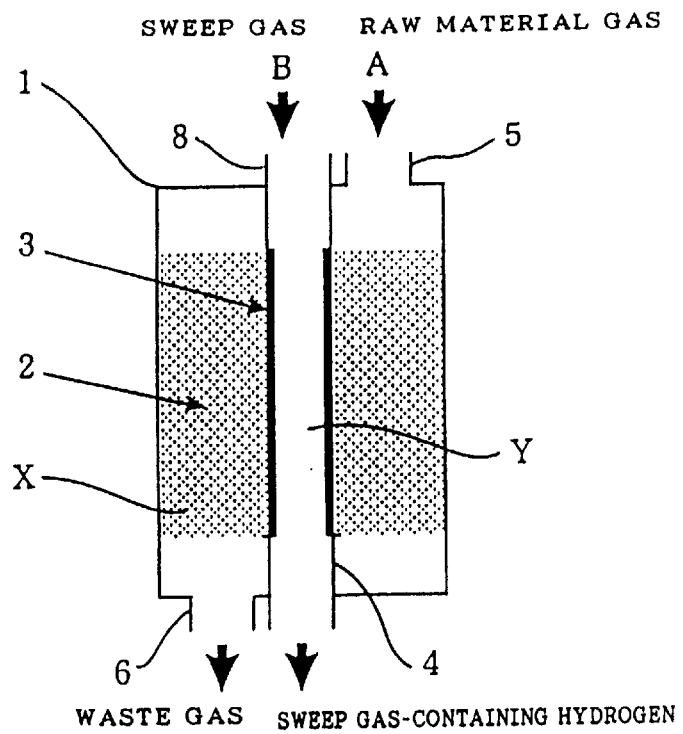
FIG. 7 is a schematic drawing showing another example of the conventional membrane reactor.
Figure 8:
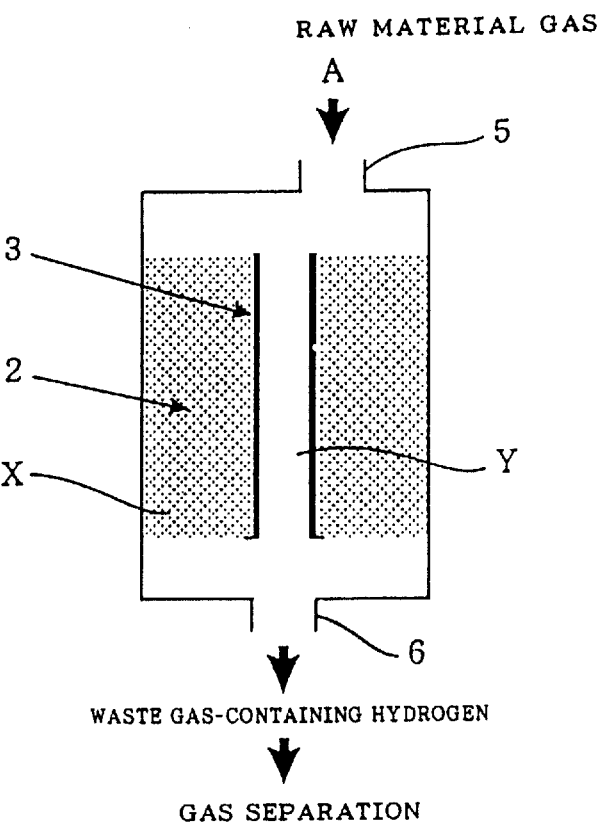
FIG. 8 is a schematic drawing showing still another example of the conventional membrane reactor.

In the present invention, in the apparatus of FIG. 7 which is a conventional known membrane reactor, steam and/or carbon dioxide can be used as a sweep gas in place of conventionally used argon gas.

When steam is used as a sweep gas, steam is mixed with hydrogen but can be easily removed from hydrogen by simple cooling (steam becomes water). Meanwhile, when carbon dioxide is used, carbon dioxide causes the following reverse reaction with hydrogen.

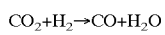

$$CO_2 + H_2 \rightarrow CO + H_2O$$

Therefore, steam is preferred as a sweep gas.

Ar as conventional sweep gas is expensive and its use requires large apparatuses such as adsorption separator, membrane separator and the like for separation and removal from hydrogen. Also when nitrogen is used as a sweep gas, there are required large apparatuses such as adsorption separator, membrane separator and the like.

When in the apparatus of FIG. 7, steam and/or carbon dioxide is used as a sweep gas, since the gas from the hydrogen formation portion and the gas from the hydrogen separation portion are separated from each other at the formed gas-discharging section, a hydrogen-containing waste gas is discharged from the outlet 6 and the total amount of hydrogen formed is not recovered.

Figure 1:
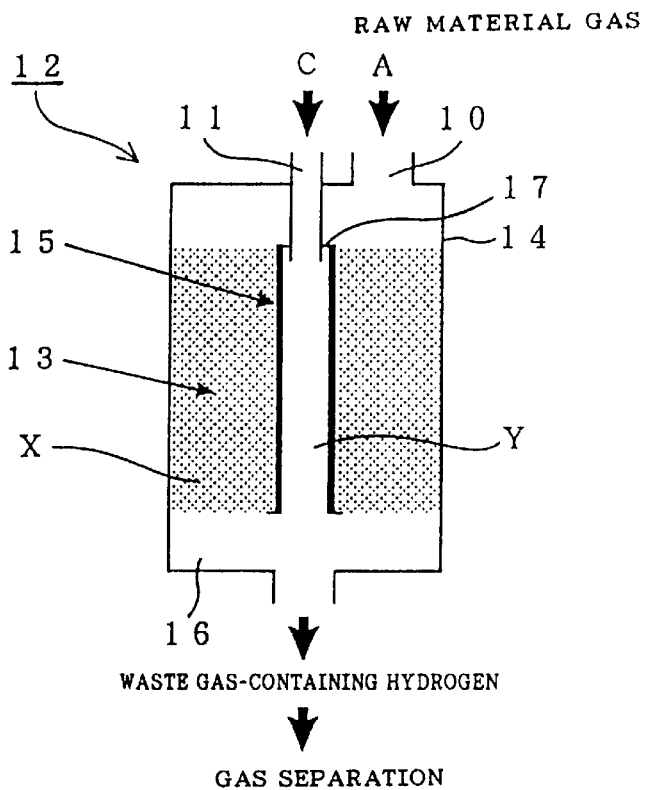
FIG. 1 is a schematic drawing showing an example of the membrane reactor of the present invention.

FIG. 1 is a schematic drawing showing an example of the membrane reactor of the present invention. In this membrane reactor, a raw material gas-introducing section 10 is connected with a hydrogen formation portion X, and a steam and/or carbon dioxide C-introducing section 11 is directly connected with a hydrogen separation portion Y.

In the membrane reactor 12 of FIG. 1, a reaction chamber 14 is constituted by a catalyst 13-filled hydrogen formation portion X, a catalyst-free hydrogen separation portion Y, and a hydrogen-selectively permeable membrane 15 dividing the two portions. A raw material gas-introducing section 10 and a steam and/or carbon dioxide-introducing section 11 are insulated by a sealing material 17. An unreacted raw material gas-containing waste gas from the hydrogen formation portion X and a steam and/or carbon dioxide C-containing hydrogen gas from the hydrogen separation portion Y are not separated and are allowed to merge with each other at a formed gas-discharging section 16.

In the example of FIG. 1, a raw material gas A fed from the raw material gas-introducing section 10 contacts with a catalyst 13 to form hydrogen, and the formed hydrogen is transmitted from the hydrogen formation portion X to the hydrogen separation portion Y via the hydrogen-selectively permeable membrane 15 and separated. The unreacted raw material gas-containing waste gas from the hydrogen formation portion X and the steam and/or carbon dioxide C-containing hydrogen gas from the hydrogen separation portion Y are allowed to merge with each other at the formed gas-discharging section 16 and are discharged outside from the discharging section 16.

The example of FIG. 1 wherein the gas from the hydrogen formation portion and the gas from the hydrogen separation portion are allowed to merge with each other at the formed gas-discharging section 16, can be applied to a steam reforming reaction which uses a large amount of steam in the reaction system. In this example, the insulation between the raw material gas-introducing section and the steam and/or carbon dioxide-introducing section, and the permeability of the hydrogen-selectively permeable membrane may be relatively low. In this example, there is obtained hydrogen which contains the unreacted raw material gas and the sweep gas (steam and/or carbon dioxide). This mixed gas is subjected to a known separation procedure to remove CO, $H_2O$ and $CO_2$ ($CO_2$ is formed when the reaction proceeds further), whereby hydrogen of high purity (about 95% or higher) can be obtained.

The apparatus of FIG. 1 also has an advantage that all the hydrogen formed in the reaction can be recovered, because the gas from the hydrogen formation portion and the gas from the hydrogen separation portion are allowed to merge with each other at the formed gas-discharging section.

Figure 2:
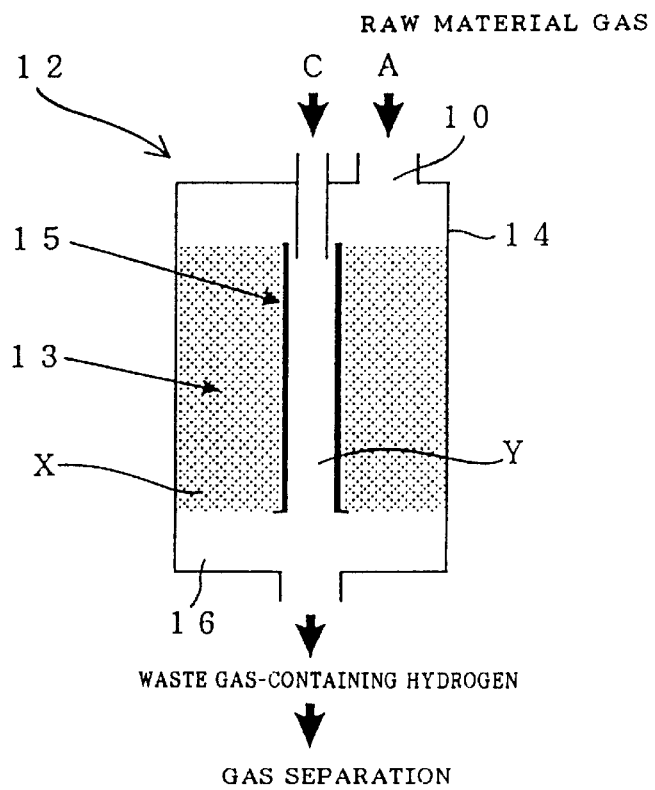
FIG. 2 is a schematic drawing showing another example of the membrane reactor of the present invention.

FIG. 2 is a schematic drawing showing another example of the membrane reactor of the present invention. This example is different from the example of FIG. 1 only in that there is no sealing material between the raw material gas-introducing section 10 and the steam and/or carbon dioxide C-introducing section 11 and a different permeability is employed.

Figure 3:
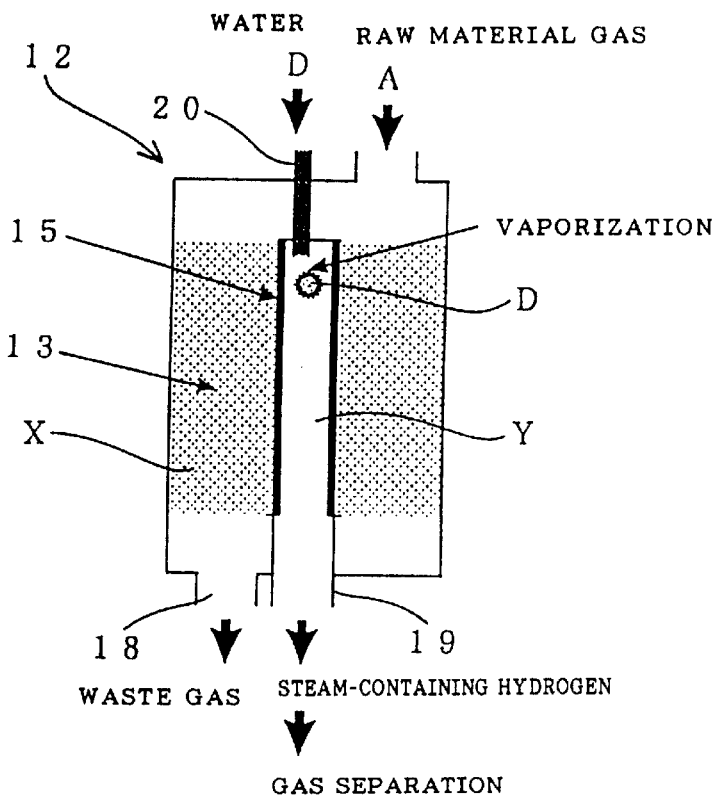
FIG. 3 is a schematic drawing showing still another example of the membrane reactor of the present invention.
Figure 4:
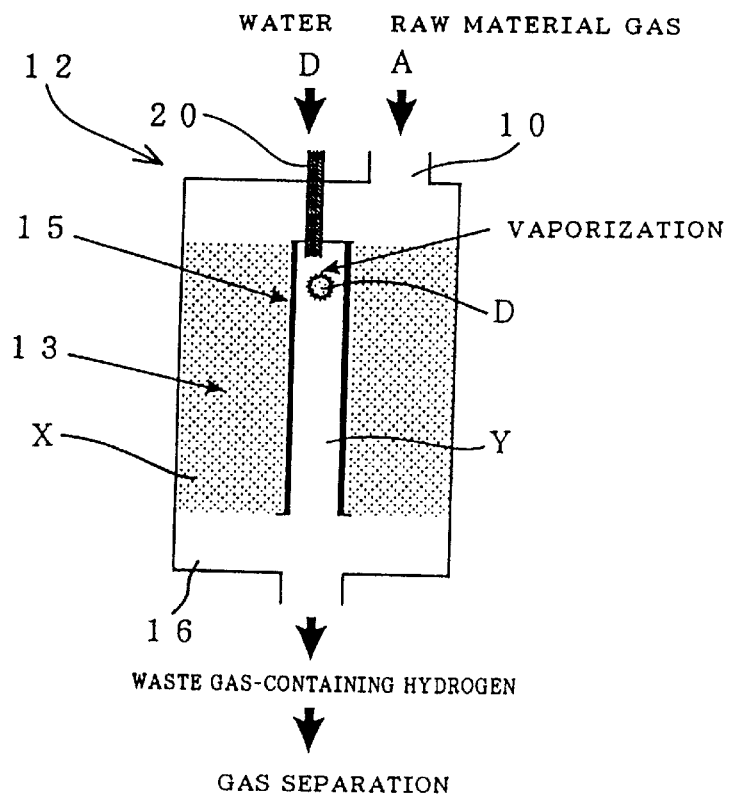
FIG. 4 is a schematic drawing showing still another example of the membrane reactor of the present invention.
Figure 5:
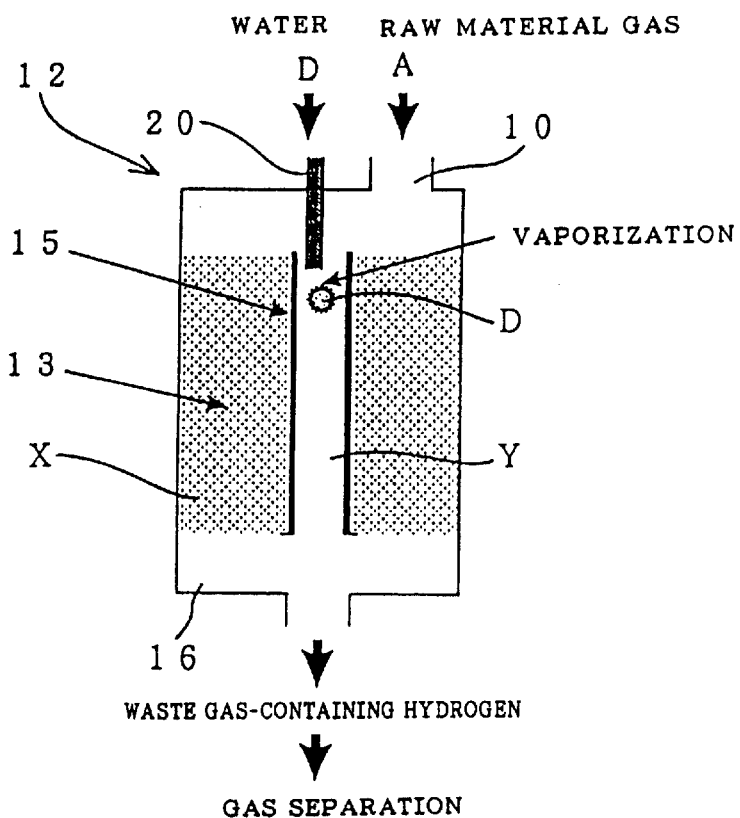
FIG. 5 is a schematic drawing showing still another example of the membrane reactor of the present invention.

FIGS. 3 to 5 are schematic drawings each showing still another example of the membrane reactor of the present invention. In each of the examples of FIGS. 3 to 5, water is injected, in place of steam, into the hydrogen separation portion of the reaction chamber.

Figure 6:
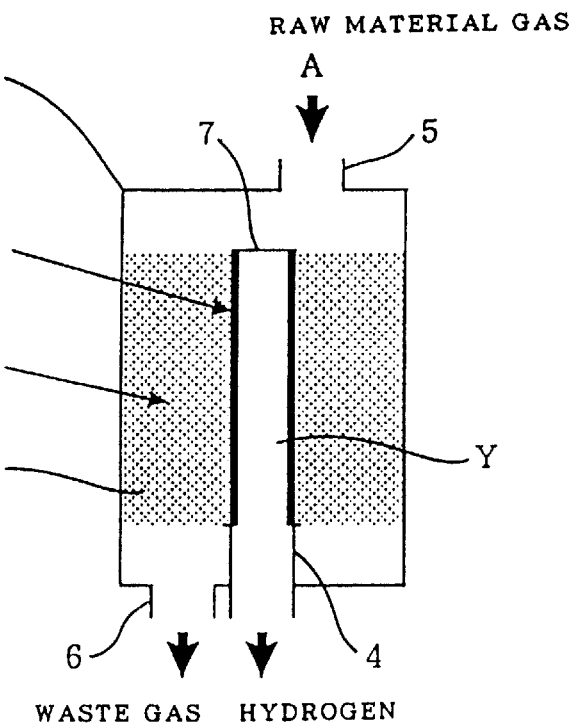
FIG. 6 is a schematic drawing showing an example of the conventional membrane reactor.

FIG. 3 is an example wherein water is injected into the hydrogen separation portion of a conventional apparatus of FIG. 6. In FIG. 3, water D is injected into the hydrogen separation portion via a water-feeding pipe 20; since the temperature of the membrane reactor is 400–600° C., the injected water D is vaporized and becomes steam; and the steam shows the same effect as mentioned above. 18 is an outlet for unreacted raw material gas-containing waste gas, and 19 is an outlet for steam and/or carbon dioxide-containing hydrogen.

FIG. 4 is an example wherein water is injected into the hydrogen separation portion of the present invention membrane reactor of FIG. 1. FIG. 5 is an example wherein water is injected into the hydrogen separation portion of the present invention membrane reactor of FIG. 2.

The examples of FIGS. 3 to 5, as compared with a case of injecting steam at a high pressure, have an advantage that the pump, compressor or the like can be simple.

In the present membrane reactor, the amount of water, steam or carbon dioxide fed into the hydrogen separation portion is experimentally determined at an optimum level based on the catalyst, hydrogen-selectively permeable membrane, amount of raw material gas, etc. used, but is preferably at least about the same as the amount of hydrogen formed.

DESCRIPTION OF PREFERRED EMBODIMENTS

EXAMPLE 1

In the reaction chamber of a membrane reactor having the structure of FIGS. 6, 7 or 3 were disposed a catalyst and a Pd-Ag hydrogen-selectively permeable membrane supported on a ceramic porous material (diameter: 10 mm, length: 100 mm).

The chamber was heated to 450° C. $C_6H_{12}$ as raw material gas was fed at 1 NL/min and the outlet of the chamber was controlled so that the pressure inside the chamber was kept at 3 kg/cm²G. In the chamber having the structure of FIG. 7, Ar or stream as sweep gas, of 2 NL/min was fed. In the chamber of the structure of FIG. 3, water of 1.6 mL/min was fed.

$C_6H_{12}$:$C_6H_6$ was measured by gas chromatography at the outlet of unreacted raw material gas-containing waste gas. While the conversion of reaction was 72% in the structure of FIG. 6 wherein no sweep gas was used, the conversions in the structures of FIGS. 7 and 3 were higher than 95%.

When steam was used, 99% or more of hydrogen was recovered by mere cooling. When Ar was used, purification of hydrogen was impossible by using the means which was available at the laboratory.

EXAMPLES 2–7 AND COMPARATIVE EXAMPLES 1–3

In each of the reaction chambers of membrane reactors having the structures of FIGS. 1 to 8 were disposed a catalyst and a Pd-Ag hydrogen-selectively permeable membrane supported on a ceramic porous material (diameter: 10 mm, length: 100 mm).

The chamber was heated to 500° C. A raw material gas and a sweep gas (Ar, steam or water) were fed as shown in Table 1. The outlet of the chamber was controlled so that the pressure inside the chamber was kept at 8 kg/cm²G.

TABLE 1

| | | | Sweep gas | | |
|---|---|---|---|---|---|
| | Structure | Raw material gas | Ar | Steam | Water |
| Comp. Ex. 1 | FIG. 6 | $CH_4$: 20%, $H_2O$: 80%, 1 NL/min | | | |
| Comp. Ex. 2 | FIG. 7 | $CH_4$: 20%, $H_2O$: 80%, 1 NL/min | 1 NL/min | | |
| Ex. 2 | FIG. 7 | $CH_4$: 20%, $H_2O$: 80%, 1 NL/min | | 1 NL/min | |
| Comp. Ex. 3 | FIG. 8 | $CH_4$: 20%, $H_2O$: 80%, 1 NL/min | | | |
| Ex. 3 | FIG. 1 | $CH_4$: 20%, $H_2O$: 80%, 1 NL/min | | 1 NL/min | |
| Ex. 4 | FIG. 2 | $CH_4$: 20%, $H_2O$: 80%, 1 NL/min | | 1 NL/min | |
| Ex. 5 | FIG. 3 | $CH_4$: 20%, $H_2O$: 80%, 1 NL/min | | | 0.8 mL/min |
| Ex. 6 | FIG. 4 | $CH_4$: 20%, $H_2O$: 80%, 1 NL/min | | | 0.8 mL/min |
| Ex. 7 | FIG. 5 | $CH_4$: 20%, $H_2O$: 80%, 1 NL/min | | | 0.8 mL/min |

$CH_4$ at the discharging section was measured by gas chromatography, whereby the conversion of $CH_4$ was determined. As to the structures of FIGS. 6 and 7, the amount of the hydrogen-containing gas at the outlet was measured, whereby the recovery of hydrogen was determined. The conversions in the membrane reactors having the structures of FIGS. 1–8 and the recoveries in the membrane reactors having the structures of FIGS. 6 and 7 were as shown in Table 2.

TABLE 2

| | Structure | Conversion |
|---|---|---|
| Comp. Ex. 1 | FIG. 6 | 68%; only 73% thereof was recovered. |
| Comp. Ex. 2 | FIG. 7 | 93%; only 75% thereof was recovered. |
| Ex. 2 | FIG. 7 | 93%; only 74% thereof was recovered. |
| Comp. Ex. 3 | FIG. 8 | 73% |
| Ex. 3 | FIG. 1 | 97% |
| Ex. 4 | FIG. 2 | 88% |
| Ex. 5 | FIG. 3 | 96% |
| Ex. 6 | FIG. 4 | 96% |
| Ex. 7 | FIG. 5 | 90% |

EXAMPLE 8

In the reaction chamber of a membrane reactor having the structure of FIGS. 6 or 7 were disposed a catalyst and a Pd-Ag hydrogen-selectively permeable membrane supported on a ceramic porous material (diameter: 10 mm, length: 100 mm).

The chamber was heated to 450° C. $C_6H_{12}$ as raw material gas was fed at 1 NL/min and the outlet of the chamber was controlled so that the pressure inside the chamber was kept at 3 kg/cm²G. In the chamber having the structure of FIG. 7, Ar or $CO_2$ as sweep gas, of 2 NL/min was fed.

$C_6H_{12}$:$C_6H_6$ was measured by gas chromatography at the outlet of unreacted raw material gas-containing waste gas. While the conversion of reaction was 72% in the structure of FIG. 6 wherein no sweep gas was used, the conversion in the structure of FIG. 7 was higher than 95%.

When the sweep gas was $CO_2$ in the structure of FIG. 7, 95% or more of hydrogen was obtained by conventional adsorption separation.

EXAMPLES 9–11 AND COMPARATIVE EXAMPLES 4–6

In each of the reaction chambers of membrane reactors having the structures of FIGS. 1, 2, 6, 7 and 8 were disposed a catalyst and a Pd-Ag hydrogen-selectively permeable membrane supported on a ceramic porous material (diameter: 10 mm, length: 100 mm).

The chamber was heated to 500° C. A raw material gas and a sweep gas (Ar or $CO_2$) were fed as shown in Table 3. The outlet of the chamber was controlled so that the pressure inside the chamber was kept at 8 kg/cm²G.

TABLE 3

| | | | Sweep gas | |
|---|---|---|---|---|
| | Structure | Raw material gas | Ar | $CO_2$ |
| Comp. Ex. 4 | FIG. 6 | $CH_4$: 20%, $H_2O$: 80%, 1 NL/min | | |
| Comp. Ex. 5 | FIG. 7 | $CH_4$: 20%, $H_2O$: 80%, 1 NL/min | 1 NL/min | |
| Ex. 9 | FIG. 7 | $CH_4$: 20%, $H_2O$: 80%, 1 NL/min | | 1 NL/min |
| Comp. Ex. 6 | FIG. 8 | $CH_4$: 20%, $H_2O$: 80%, 1 NL/min | | |
| Ex. 10 | FIG. 1 | $CH_4$: 20%, $H_2O$: 80%, 1 NL/min | | 1 NL/min |
| Ex. 11 | FIG. 2 | $CH_4$: 20%, $H_2O$: 80%, 1 NL/min | | 1 NL/min |

$CH_4$ at the discharging section was measured by gas chromatography, whereby the conversion of $CH_4$ was determined. As to the structures of FIGS. 6 and 7, the amount of the hydrogen-containing gas at the outlet was measured, whereby the recovery of hydrogen was determined. The conversions in the membrane reactors having the structures of FIGS. 1, 2, 6, 7 and 8 and the recoveries in the membrane reactors having the structures of FIGS. 6 and 7 were as shown in Table 4.

TABLE 4

|  | Structure | Conversion |
| --- | --- | --- |
| Comp. Ex. 4 | FIG. 6 | 68%; only 73% thereof was recovered. |
| Comp. Ex. 5 | FIG. 7 | 93%; only 75% thereof was recovered. |
| Ex. 9 | FIG. 7 | 93%; only 60% thereof was recovered. |
| Comp. Ex. 6 | FIG. 8 | 73% |
| Ex. 10 | FIG. 1 | 85% |
| Ex. 11 | FIG. 2 | 80% |

As described above, in the method for operation of membrane reactor according to the present invention, the surface area of the hydrogen-selectively permeable membrane of membrane reactor can be made smaller while the advantage of membrane reactor of giving a higher conversion of reaction at low temperatures is being maintained.

What is claimed is:

1. In a method for production of hydrogen in a membrane reactor wherein hydrogen formed in a hydrogen formation portion of a reaction chamber is transmitted to the hydrogen separation portion of the reaction chamber via a hydrogen-selectively permeable membrane thereby to improve the conversion of raw material gas into hydrogen, the improvement comprising adding steam and/or carbon dioxide as a sweep gas into the hydrogen separation portion of the reaction chamber.

2. A method for operation of membrane reactor according to claim 1, wherein in the membrane reactor the hydrogen formation portion and the hydrogen separation portion are completely separated from each other.

3. A method for operation of membrane reactor according to claim 1, wherein in the membrane reactor the hydrogen formation portion and the hydrogen separation portion are separated from each other at the raw material gas-introducing section and at the reaction section, but the gas from the hydrogen formation portion and the gas from the hydrogen separation portion are allowed to merge with each other at the formed gas-discharging section of the reactor.

4. A method for operation of membrane reactor according to claim 1, wherein in the membrane reactor the hydrogen formation portion and the hydrogen separation portion are not separated from each other at the raw material gas-introducing section, and the gas from the hydrogen formation portion and the gas from the hydrogen separation portion allowed to merge with each other at the formed gas-discharging section.

5. A method for operation of membrane reactor according to claim 1, wherein water is fed into the hydrogen separation portion and is vaporized as steam in the hydrogen separation portion.

* * * * *